US009853529B2

(12) United States Patent
Singh (10) Patent No.: US 9,853,529 B2
(45) Date of Patent: Dec. 26, 2017

(54) LINEAR INDUCTION GENERATOR USING MAGNETIC REPULSION

(71) Applicant: Ishwar Ram Singh, Mississauga (CA)

(72) Inventor: Ishwar Ram Singh, Mississauga (CA)

( * ) Notice: Subject to any disclaimer, the term of this patent is extended or adjusted under 35 U.S.C. 154(b) by 0 days.

(21) Appl. No.: 15/168,168

(22) Filed: May 30, 2016

(65) Prior Publication Data

US 2016/0276916 A1    Sep. 22, 2016

Related U.S. Application Data

(63) Continuation-in-part of application No. 14/264,438, filed on Apr. 29, 2014, now Pat. No. 9,647,522.

(51) Int. Cl.
| | |
|---|---|
| *H02K 35/02* | (2006.01) |
| *F03D 3/00* | (2006.01) |
| *F03D 9/00* | (2016.01) |
| *H02K 1/34* | (2006.01) |
| *H02K 7/06* | (2006.01) |
| *H02K 7/11* | (2006.01) |
| *F03D 9/25* | (2016.01) |

(52) U.S. Cl.
CPC .............. *H02K 35/02* (2013.01); *F03D 3/005* (2013.01); *F03D 9/25* (2016.05); *H02K 1/34* (2013.01); *H02K 7/06* (2013.01); *H02K 7/11* (2013.01); *F05B 2210/16* (2013.01); *Y02E 10/74* (2013.01)

(58) Field of Classification Search
CPC .............. H02K 35/02; H02K 7/06; H02K 1/34
See application file for complete search history.

(56) References Cited

U.S. PATENT DOCUMENTS

| 3,149,254 A | 9/1964 | Carter et al. |
|---|---|---|
| 4,011,477 A | 3/1977 | Scholin |
| 4,639,626 A | 1/1987 | McGee |
| 5,347,186 A | 9/1994 | Konotchick |
| (Continued) | | |

FOREIGN PATENT DOCUMENTS

| CN | 102097906 A | 6/2011 |
|---|---|---|
| WO | WO 02/27899 A1 | 4/2002 |
| WO | WO 2010/144067 A1 | 12/2010 |

OTHER PUBLICATIONS

International Search Authority (ISA/CA), International Search Report and Written Opinion, dated Jul. 16, 2015, for corresponding International Patent Application No. PCT/CA2015/000256.

(Continued)

*Primary Examiner* — Viet Nguyen
(74) *Attorney, Agent, or Firm* — Gowling WLG (Canada) LLP (57) ABSTRACT

An electrical generator, comprising: a stator having a coil and a lift magnet coupled by a lever to an induction magnet, the induction magnet moveable longitudinally within the coil, the lever configured to move the induction magnet a multiple of a distance that the lift magnet is moved; and, a rotor moveable with respect to the stator, the rotor having a rotor magnet, the rotor magnet and the lift magnet positioned with respective magnetic moments opposing; whereby movement of the rotor magnet toward the lift magnet causes the lift magnet to move away from the rotor magnet which in turn causes, by operation of the lever, the induction magnet to move within the coil to generate a first electromotive force therein.

23 Claims, 9 Drawing Sheets

(56) References Cited

U.S. PATENT DOCUMENTS

| | | | |
|---|---|---|---|
| 5,975,714 A | 11/1999 | Vetorino et al. | |
| 6,232,689 B1 | 5/2001 | Fujita et al. | |
| 7,310,944 B2 | 12/2007 | Sabol et al. | |
| 7,323,790 B2* | 1/2008 | Taylor | F03B 13/1895 290/42 |
| 7,498,682 B2 | 3/2009 | Lemieux | |
| 7,573,163 B2 | 8/2009 | Tu et al. | |
| 7,884,519 B2 | 2/2011 | Okuno | |
| 8,013,464 B2 | 9/2011 | Stern et al. | |
| 8,097,990 B2 | 1/2012 | Nair et al. | |
| 8,154,144 B2 | 4/2012 | Muller et al. | |
| 8,203,228 B2 | 6/2012 | Smith | |
| 8,324,772 B2 | 12/2012 | Barbar | |
| 8,487,484 B1 | 7/2013 | Miller | |
| 8,492,936 B1 | 7/2013 | Waters | |
| 8,975,764 B1 | 3/2015 | Abehasera | |
| 2009/0185905 A1* | 7/2009 | Farb | F03D 1/04 416/131 |
| 2010/0065260 A1* | 3/2010 | Sakamoto | B06B 1/045 165/121 |
| 2010/0253093 A1 | 10/2010 | Mac Donald | |
| 2010/0276938 A1 | 11/2010 | Smith | |
| 2011/0175463 A1* | 7/2011 | Ketchersid, Jr. | H02K 7/075 310/15 |
| 2011/0193347 A1* | 8/2011 | Leijon | F03B 13/1885 290/53 |
| 2011/0298217 A1 | 12/2011 | Hochberg | |
| 2012/0013131 A1 | 1/2012 | Yeh | |
| 2012/0062048 A1* | 3/2012 | Kaneko | H02K 7/06 310/20 |
| 2012/0104877 A1 | 5/2012 | Isaacs | |
| 2012/0242086 A1 | 9/2012 | Yang | |
| 2012/0313457 A1 | 12/2012 | Raghuprasad | |
| 2013/0015667 A1 | 1/2013 | Fullerton et al. | |
| 2013/0127268 A1* | 5/2013 | Atherton | G01P 3/22 310/46 |
| 2014/0117786 A1* | 5/2014 | Gosvener | H02K 7/075 310/23 |
| 2014/0152125 A1* | 6/2014 | Gray | H02K 7/1876 310/24 |
| 2014/0239644 A1* | 8/2014 | Hochberg | H02K 7/1876 290/54 |
| 2014/0265649 A1* | 9/2014 | Fofonoff | H02K 7/06 310/20 |
| 2014/0375149 A1* | 12/2014 | Kobayashi | H02K 7/1876 310/30 |
| 2015/0214880 A1* | 7/2015 | Gialdella | H02P 27/06 318/14 |
| 2016/0141946 A1* | 5/2016 | Mochizuki | H02K 53/00 310/113 |
| 2016/0226342 A1* | 8/2016 | Onose | F02G 1/043 |
| 2016/0285344 A1* | 9/2016 | Lee | H02K 7/06 |
| 2016/0294272 A1* | 10/2016 | Mak | H02K 35/02 |
| 2016/0359401 A1* | 12/2016 | Deak, Sr. | H02K 35/02 |

OTHER PUBLICATIONS

Written Opinion dated August 15, 2017 Issued by the Canadian Intellectual Property Office for Corresponding International PCT Patent Application No. PCT/CA2017/050654.

International Search Report dated August 15, 2017 Issued by the Canadian Intellectual Droperty Office for Corresponding International PCT Patent Application No. PCT/CA2017/050654.

* cited by examiner

LINEAR INDUCTION GENERATOR USING MAGNETIC REPULSION

The application is a continuation-in-part of U.S. patent application Ser. No. 14/264,438, filed Apr. 29, 2014, and incorporated herein by reference.

FIELD

The present disclosure relates generally to generation of electricity. More particularly, the disclosure relates to linear induction electrical generators.

BACKGROUND

Figure 1:
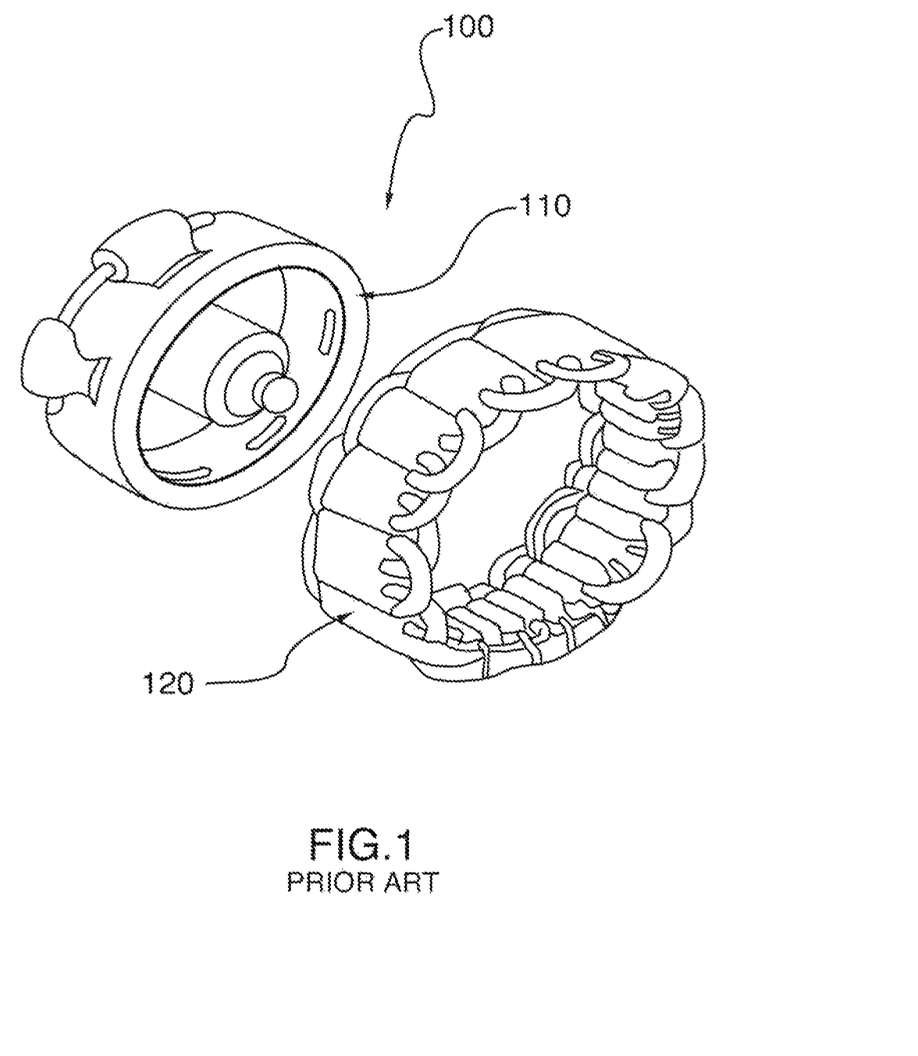
FIG. 1 is a diagram of prior art electrical generator design using a rotor and stator.

Electricity is typically generated by having magnets, either permanent magnets or electromagnets, attached to a rotor that pass in close proximity to a stationary set of conductors wound in coils, called the stator. The rotor is moved by kinetic energy that can be produced by wind, water, steam, etc. The electromagnetic field of the magnets on the rotor induces electrical current in the coils of the stator. FIG. 1 illustrates a prior art electrical generator design 100 that has a rotor 110 containing magnets than rotates within the stator 120 that contains the coils.

In the electrical generator design 100, the thickness of the coils on the stator 120 is limited by the size of the magnetic field of the magnets on the rotor 110. In order to produce more electricity using this design, more wire coils must be added to the stator 120 which increases the diameter and the rotor 110 must also increase in size to include more magnets that remain perpendicular to the coils on the stator 120. This causes the size and weight of the generator to be greatly increased. The main reason that utility grade wind turbines are so large is because a large force is require to rotate the weight of the rotor.

U.S. Pat. No. 8,203,228 to Smith, which is incorporated herein by reference, provides an improved aerogenerator that translates the rotary motion of the impeller into a reciprocating linear motion that moves a magnet within an induction coil to generate electricity. Smith describes a mechanical linkage that uses a rotatable cam plate in order to reciprocate the magnet within the induction coil. The mechanical linkage increases the size, weight, and costs of the generator.

A need therefore exists for an improved linear induction generator. Accordingly, a solution that addresses, at least in part, the above and other shortcomings is desired.

SUMMARY

According to a first aspect of the disclosure, an electrical generator is provided comprising a tube assembly having a tube with an induction coil surrounding the tube and an induction magnet within the tube, the induction magnet moveable longitudinally within the tube; and a rotor assembly having a rotor magnet, the rotor magnet positioned with an opposing magnetic moment to the induction magnet, wherein the rotor assembly is moved with respect to the tube assembly to cause the rotor magnet to move towards an end of the tube, the rotor magnet repels the induction magnet causing it to move within the tube and generate an electromotive force in the induction coil. The tube assembly can be vertical and as the rotor magnet moves away from the end of the tube, the induction magnet will drop within the tube due to gravity and generate a second electromotive force in the induction coil. The rotor magnet can also move in a plane perpendicular to a longitudinal axis of the tube. The induction coil can be a wire that is helically wrapped around the tube. In some aspects, the tube assembly can have a plurality of induction magnets and a plurality of induction coils, and can be configured to generate three-phase power. The rotor assembly can be mechanically coupled to a turbine or directly coupled to blades of a vertical axis wind turbine.

In some aspects, the electrical generator can have a plurality of tube assemblies, and also have a plurality of rotor magnets on the rotor assembly. In some aspects, the rotor assembly can have a rotatable disk adjacent the end of the tubes of the tube assembly, and the rotatable disk having the plurality of rotor magnets disposed thereon. The plurality of tube assemblies can be arranged toroidally. In some aspects, the rotor assembly can further include a second rotatable disk coupled to the first rotatable disk, and the second rotatable disk can be adjacent to an opposing end of the tubes of the tube assembly. The second rotatable disk can have secondary rotor magnets offset from corresponding rotor magnets, the secondary rotor magnets configured to repel the induction magnets. In some aspects, the tube assemblies can be positioned horizontally, and the second rotatable disk can comprise opposing rotor magnets positioned opposite from corresponding rotor magnets, the opposing rotor magnets configured to attract the induction magnets.

In a second aspect, there is provided a method for generating electricity comprising providing a tube assembly having a tube with an induction coil surrounding the tube and an induction magnet within the tube, the induction magnet moveable longitudinally within the tube; and moving a rotor magnet towards an end of the tube, the rotor magnet repels the induction magnet causing it to move within the tube and generate an electromotive force in the induction coil.

In a third aspect, there is provided an electrical generator, comprising: a stator having a coil and a lift magnet coupled by a lever to an induction magnet, the induction magnet moveable longitudinally within the coil, the lever configured to move the induction magnet a multiple of a distance that the lift magnet is moved; and, a rotor moveable with respect to the stator, the rotor having a rotor magnet, the rotor magnet and the lift magnet positioned with respective magnetic moments opposing; whereby movement of the rotor magnet toward the lift magnet causes the lift magnet to move away from the rotor magnet which in turn causes, by operation of the lever, the induction magnet to move within the coil to generate a first electromotive force therein.

In a fourth aspect, there is provided a method of generating electricity, comprising: providing a stator having a coil and a lift magnet coupled by a lever to an induction magnet, the induction magnet moveable longitudinally within the coil, the lever configured to move the induction magnet a multiple of a distance that the lift magnet is moved; and, moving a rotor with respect to the stator, the rotor having a rotor magnet, the rotor magnet and the lift magnet positioned with respective magnetic moments opposing; whereby moving the rotor magnet toward the lift magnet causes the lift magnet to move away from the rotor magnet which in turn causes, by operation of the lever, the induction magnet to move within the coil to generate a first electromotive force therein.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

Figure 2A:
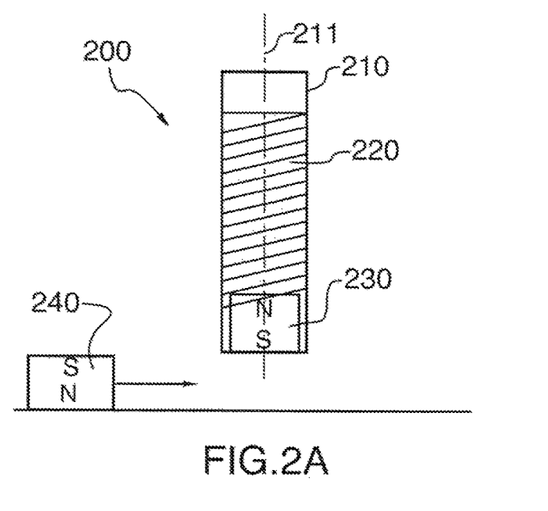
FIG. 2A is a side view of an electrical generator having an induction coil wrapped around a tube having an internal induction magnet in a resting position.

Referring first to FIG. 2A, shown is a side view of an embodiment of an electrical generator 200 comprising a tube 210 having an induction coil 220 of wire helically wrapped around its exterior and an induction magnet 230 that is free to move within tube 210. Induction magnet 230 is currently located at the bottom portion of tube 210 due to the force of gravity. Tube 210, coil 220 and induction magnet 230 provide a linear electric generator that generates an electromotive force ("emf") within the wire of coil 220 as the magnet 230 slides back and forth in tube 210.

Linear electric generators based on a moving magnet within a solenoid (a helically wound wire) are known. This type of electric generator is used in the Faraday flashlight, named after Faraday's law of induction upon which its operation is based, that uses a sliding magnet that moves back and forth through the center of a coil of copper wire when the flashlight is shaken. The aerogenerator taught by Smith, as described above, also uses a linear electric generator that mechanically reciprocates a magnet within an induction coil.

Electrical generator 200 further includes a rotor magnet 240. The term "rotor" is used to indicate that rotor magnet 240 would typically be coupled to the moving or rotating portion of electrical generator 200. Induction magnet 230 is so named because it induces the electromotive force (emf) in coil 220.

FIG. 2A illustrates rotor magnet 240 translating perpendicularly relative to axis 211 of tube 210. The magnetic moment of induction magnet 230 and rotor magnet 240 are aligned substantially parallel with axis 211 to provide a repulsion force between the two. The magnetic moment (or magnetic dipole moment) is a vector that points from the magnets south pole towards its north pole. Induction magnet 230 and rotor magnet 240 are illustrated as having poles facing in opposite directions (denoted by "N" for north and "S" for south), and thus, induction magnet 230 and rotor magnet 240 have opposing magnetic moments.

Figure 2B:
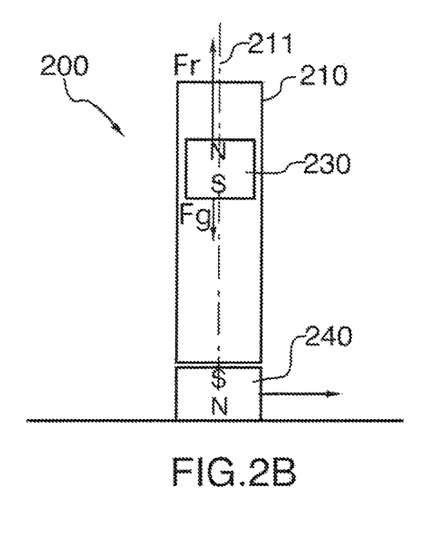
FIG. 2B is a cross-sectional view of the electrical generator of FIG. 2A with the induction magnet moving upwards within the induction coil from the repulsion force of a moving rotor magnet.

Referring next to FIG. 2B, shown is a cross-section of electrical generator 200 illustrating the interaction of induction magnet 230 and rotor magnet 240. When the magnetic fields of induction magnet 230 and rotor magnet 240 interact, induction magnet 230 is repelled and moves upwards within tube 210. Rotor magnet 240 is illustrated in alignment with axis 211 of tube 210 but the magnetic fields will interact as rotor magnet 240 approaches tube 210. Induction magnet 230 is constrained by tube 210 so that the magnetic repulsion force causes induction magnet to move upwards and maintain the direction of it magnetic moment (i.e. the orientation of its poles).

The force on induction magnet 230 from the repulsive magnetic force is illustrated by the vector labelled $F_r$ and the gravitational force is illustrated by the vector labelled $F_g$. The repulsive magnetic force is larger than the gravitational force causing the induction magnet to move upwards within tube 210. As noted above, movement of induction magnet 230 generates an electromotive force that induces a current in the wire of coil 220.

Figure 2C:
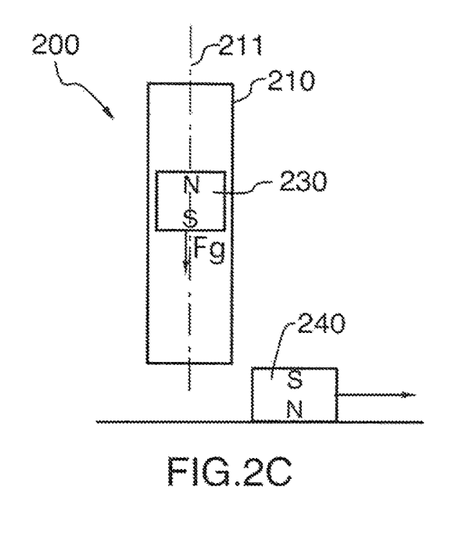
FIG. 2C is a cross-sectional view of the electrical generator of FIG. 2A with the induction magnet moving downwards within the induction coil.

Referring next to FIG. 2C, shown is a cross-section of electrical generator 200 illustrating rotor magnet 240 moving away from tube 210 so that the magnetic fields of rotor magnet 240 and induction magnet 230 no longer interact. Rotor magnet 240 no longer causes a magnetic repulsion force to act on induction magnet 230 and the gravitational force causes induction magnet 230 to move downwards within tube 210. This downward movement of induction magnet 230 will generate an electromotive force that induces a current in the wire of coil 220. This emf and current will be opposite from that generated from the upwards movement illustrated in FIG. 2B, and will thus cause an alternating current within the wire of coil 220.

In order to generate a continuous alternating current, rotor magnet 240 is continually moved into and out of the magnetic field of induction magnet 230. Rotor magnet 240 can be mechanically coupled to a turbine in order to continuously generate electricity. A turbine converts the kinetic and potential energy from a working fluid into a rotational movement. The turbine includes a rotor, which is a shaft or drum with blades attached. The moving fluid acts on the blades so that they impart rotational energy to the rotor. The turbine can be driven by water, wind, steam or other sources of fluid energy, and can include, for example, steam turbines, gas turbines, reciprocating engines, hydro turbines, and wind turbines. Rotational movement may also be provided by a motor coupled to the generator 200. The motor may be driven by electricity, heat (e.g. a Stirling engine), gas, diesel, hydrogen, or other power source.

In one embodiment, rotor magnet 240 can be mechanically coupled to a turbine to move rotor magnet 240 in a plane perpendicular to axis 211 of tube 210 as shown in FIGS. 2A-C. In other embodiments, rotor magnet 240 can be mechanically coupled to reciprocate axially with respect to tube 210.

Some embodiments of electrical generator 200 can include multiple tubes 210, each with an induction magnet 230 and induction coil 220, that can interact with a rotor magnet 240. Still other embodiments can include multiple tubes 210, each with an induction magnet 230 and induction coil 220, and multiple rotor magnets 240 that interact with each of the multiple tubes 210 and induction magnets 230.

Figure 3:
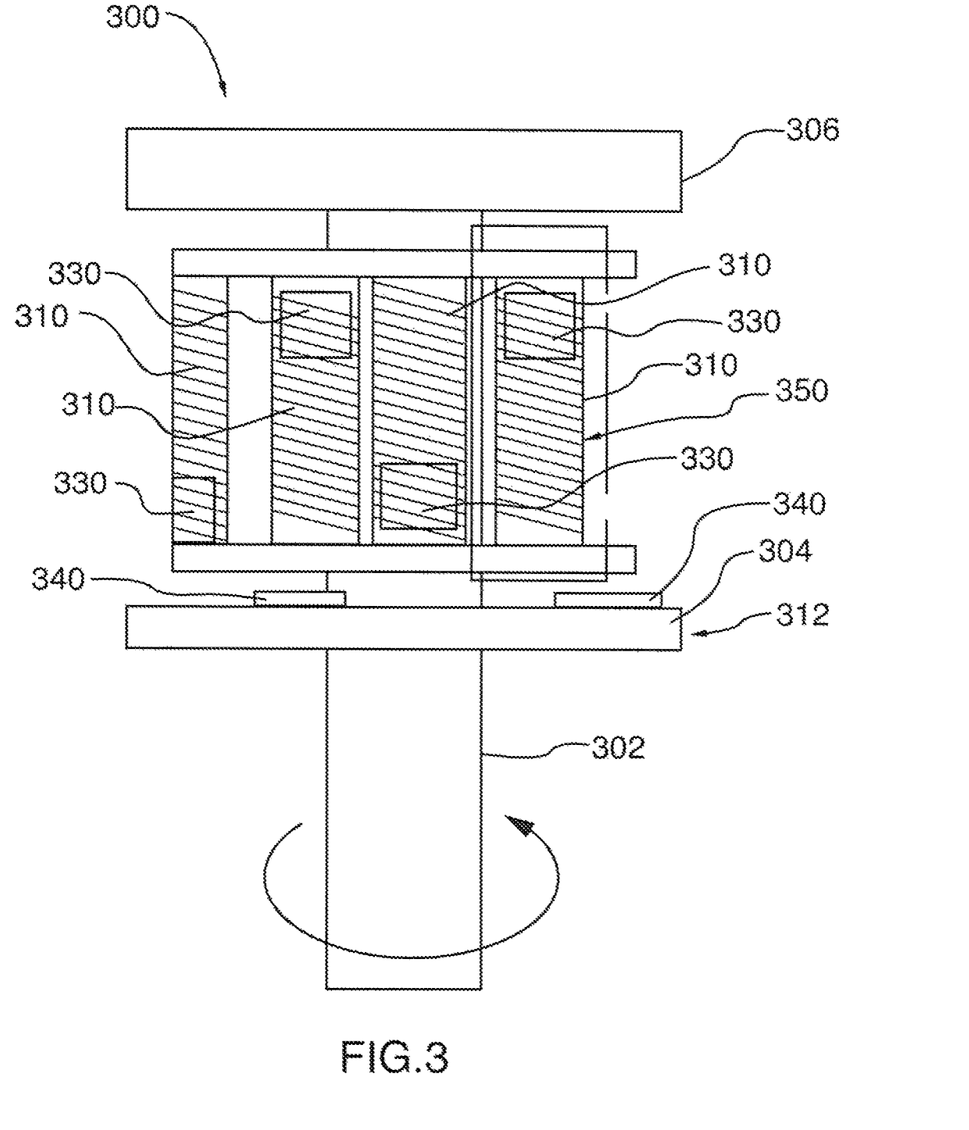
FIG. 3 is a cross-sectional view illustrating an embodiment of a rotor and tube assembly of an electrical generator operating on the principle illustrated in FIGS. 2A-C.

Referring now to FIG. 3, shown is a vertical axis electrical generator 300 having a rotor assembly 312 that can have one or more rotor magnets 340 attached thereto that interact with induction magnets 330 each contained in a tube 310 of a tube assembly 350. Each tube 310 has an induction coil (e.g. a wire helically wrapped around the tube) for inducing a current from the movement of induction magnet 330. Tubes 310 can be arranged toroidally in tube assembly 350 around shaft 302 of rotor assembly 312. Tube assembly 350 is attached in a fixed position such that rotation of rotor assembly 312 causes rotor magnets 340 to move in a plane perpendicular to the axis of tubes 310.

Rotor magnets 340 can be mounted on a lower disk 304 of rotor assembly 312 and are sufficiently spaced from one another to allow induction magnets 330 to descend within the tubes 310 due to gravity prior to the magnetic field of the next rotor magnet 340 interacting with the magnetic field of induction magnet 330 that would cause it to rise. This spacing results in more tubes 310 in the tube assembly than rotor magnets 340 on rotor assembly 312. The rotor assembly 312 may also include an upper disk 306 which is described further below.

Rotor assembly 312 can be mechanically coupled to a turbine to impart rotational force to cause the rotor magnets 340 to move with respect to static tube assembly 350. In some embodiments, the turbine can be coupled to the rotor assembly 312 using gears. In vertical axis wind turbine embodiments, for example, such as that illustrated in U.S. Pat. No. 8,013,464 to Stern, et al, which is incorporated herein by reference, blades of the turbine can be directly attached to the rotor assembly 312 of electrical generator 300. This simplifies the design and removes any inefficiencies introduced by gear-based designs.

Some embodiments can include a tube assembly 350 having multiple induction magnets within a tube 310 and multiple sets of induction coils 220. This can allow multi-phase power generation such as three-phase power generation which is the standard used for most generators.

Induction magnets 330 and rotor magnets 340 can be permanent magnets. In some embodiments, rare earth permanent magnets can be used. Rare earth magnets produce a compact high-strength magnet. The most common types of rare-earth magnets are samarium-cobalt and neodymium-iron-boron ("NIB") magnets. In some embodiments, rotor magnets 340 can be electromagnets that are used to repel induction magnets 330.

The movement of induction magnet 330 can be damped by air pressure on either side of it within the tube 310, if it has too little clearance with the inside of the tube. In one embodiment, tube assembly 350 is capped at each end and under vacuum to limit the effects of air pressure. In one embodiment, induction magnets 330 have a tight tolerance to the interior diameter of the tube 310 so that the induction coils of the tube assembly 350 have an increased exposure to the magnetic field of induction magnet 330. Each end of the tube assembly 350 can also have a cap magnet (not shown) that has a magnetic moment opposed to induction magnet 330 to prevent induction magnet 330 from reaching the end of the tube assembly 310.

According to one embodiment, there may be provided a smaller magnet (e.g. a cap magnet) attached to the bottom end of the sealed linear generator 300 with like poles facing the induction magnet 330 within the linear generator 300 that prevents the magnet 330 within the linear generator 300 from hitting the bottom of the sealed linear generator 300. This arrangement may also be used at the top end of the sealed linear generator 300, preventing the magnet 330 within the linear generator 300 from hitting the top of the sealed linear generator 330 when acted upon by attractive forces of the secondary rotor magnet 340 on the rotor with a dissimilar pole attracting the magnet 330 within the linear generator 300. The end cap magnets described herein may be used in both vertically and horizontally mounted generators (e.g. FIGS. 3 and 4).

In other embodiments, induction magnet 330 can also be shaped to mitigate the effects of air pressure. A relatively large clearance between the diameter of induction magnets 330 and the inside diameter of tube 310 will allow air to move easily around induction magnet 330. In other embodiments, the induction magnets 330 can have holes co-axial with the longitudinal axis of tube 310, such as a toroidally shaped magnet, for example, such that air will be free to pass through them and not damp the magnet's movement. In still other embodiments, tube 310 can also be constructed to allow air to escape at its ends, such as by holes in both end portions, to limit air dampening of induction magnet 330.

Figure 4:
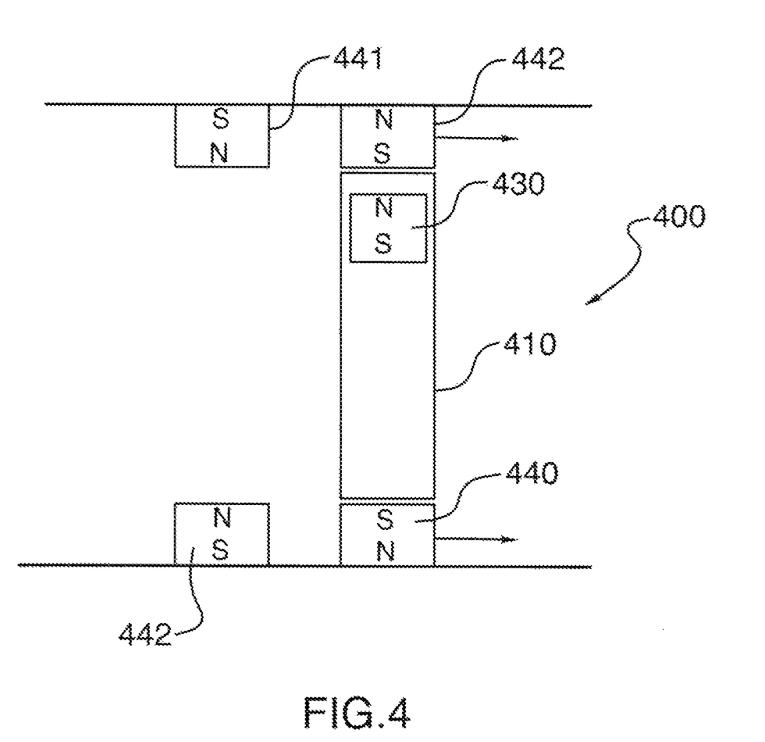
FIG. 4 is a cross-sectional view illustrating an embodiment of an electrical generator including additional rotor magnets to allow horizontal orientation of the electrical generator.

Referring now to FIG. 4, shown is an alternate embodiment of an electrical generator 400 that can be used in a horizontal orientation of tube 410. Electrical generator 400 operates similarly to that of electrical generator 200 illustrated in FIGS. 2A-C and similar parts are similarly numbered. In a horizontal orientation, additional magnets can be used on the rotor assembly to provide an opposing force on induction magnet 430 that is supplied by gravity in electrical generator 200 of FIGS. 2A-C. Rotor assembly 312 of FIG. 3 can be horizontally oriented by including additional rotor magnets on upper disk 306 as will be described with respect to FIG. 4.

Secondary rotor magnet 441 can be placed on an opposing end of tube 410 from rotor magnet 440 and offset from rotor magnet 440 to repel induction magnet 430 in the opposite direction (i.e. back towards rotor magnet 440). Secondary rotor magnet 441 has the same magnetic moment as rotor magnet 440. As the rotor assembly is in motion, first, rotor magnet 440 will repel induction magnet 430 away (i.e. upwards in FIG. 4). As the rotor assembly moves with respect to tube 410 (i.e. from left to right in FIG. 4), the field of secondary rotor magnet 441 can interact with induction magnet 430 causing it to move in the opposite direction (i.e. downwards in FIG. 4). A rotor assembly can be designed with multiple sets of rotor magnet 440 and secondary rotor magnet 441 to cause induction magnet 430 to reciprocate within tube 410 to generate electromotive force in an induction coil wrapped around tube 410 to provide an alternating current.

A rotor assembly can also include an opposing rotor magnet 442 that is positioned opposite rotor magnet 440 and has an opposite magnetic moment to rotor magnet 440. In FIG. 4, as rotor magnet 440 repels induction magnet 430, opposing rotor magnet 442 attracts induction magnet 430. Secondary rotor magnet 441 can also have an opposing rotor magnet 442 positioned opposite to it that assists to move induction magnet 430 in an opposite direction from that of rotor magnet 440. The use of opposing rotor magnet 442 can be less preferable as the strong attractive force with induction magnet 430 must be limited.

Figure 5:
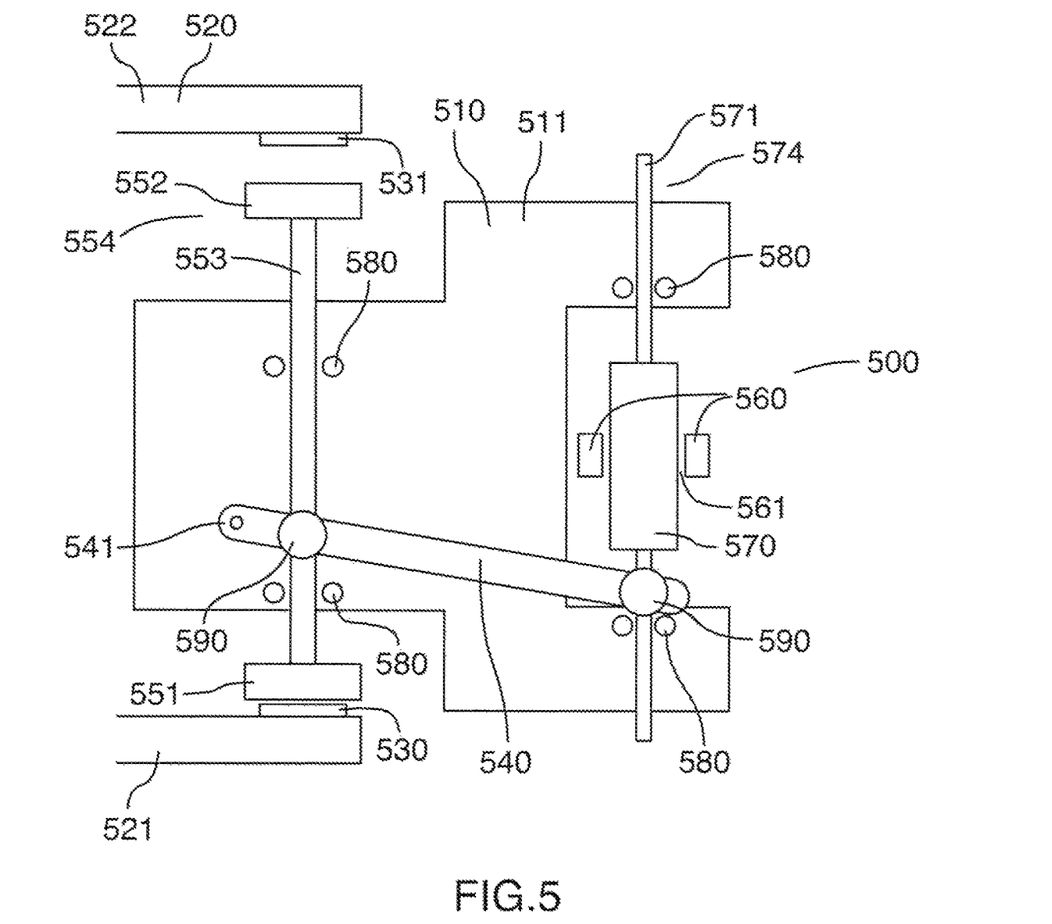
FIG. 5 is a cross-sectional view illustrating an embodiment of an electrical generator having a levered translator, the lever of the translator shown in a lowered position.
Figure 6:
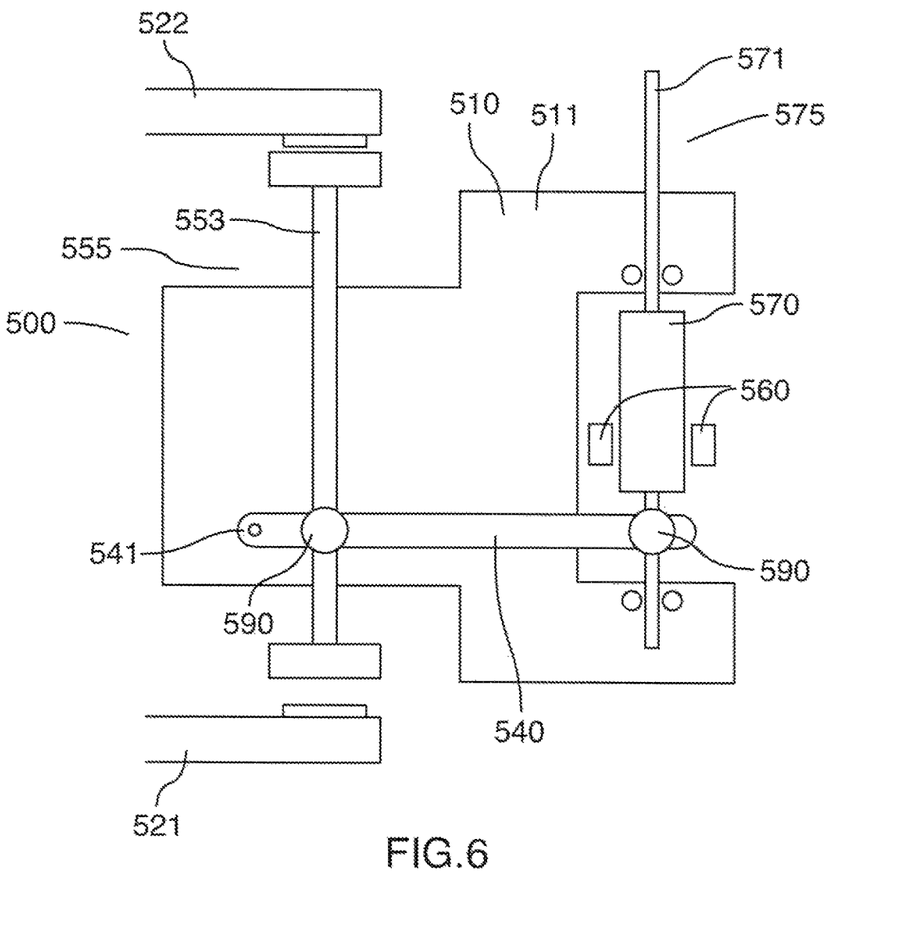
FIG. 6 is a cross-sectional view illustrating the electrical generator of FIG. 5, the lever of the translator shown in a raised position.
Figure 7:
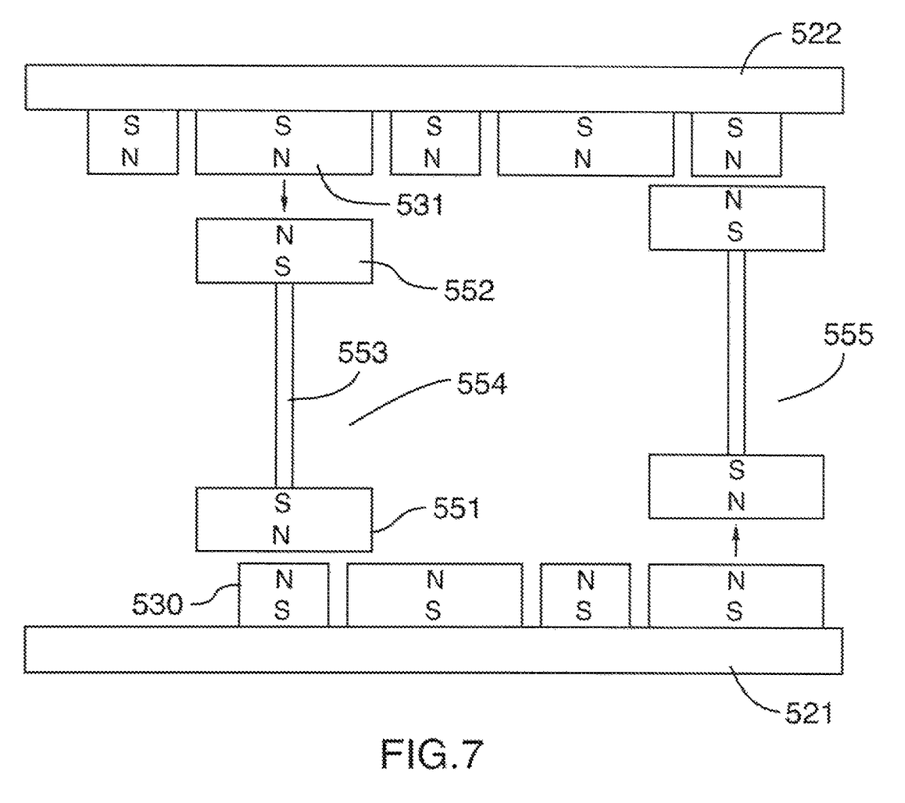
FIG. 7 is a partial side view illustrating a rotor configuration for the electrical generator of FIG. 5.
Figure 8:
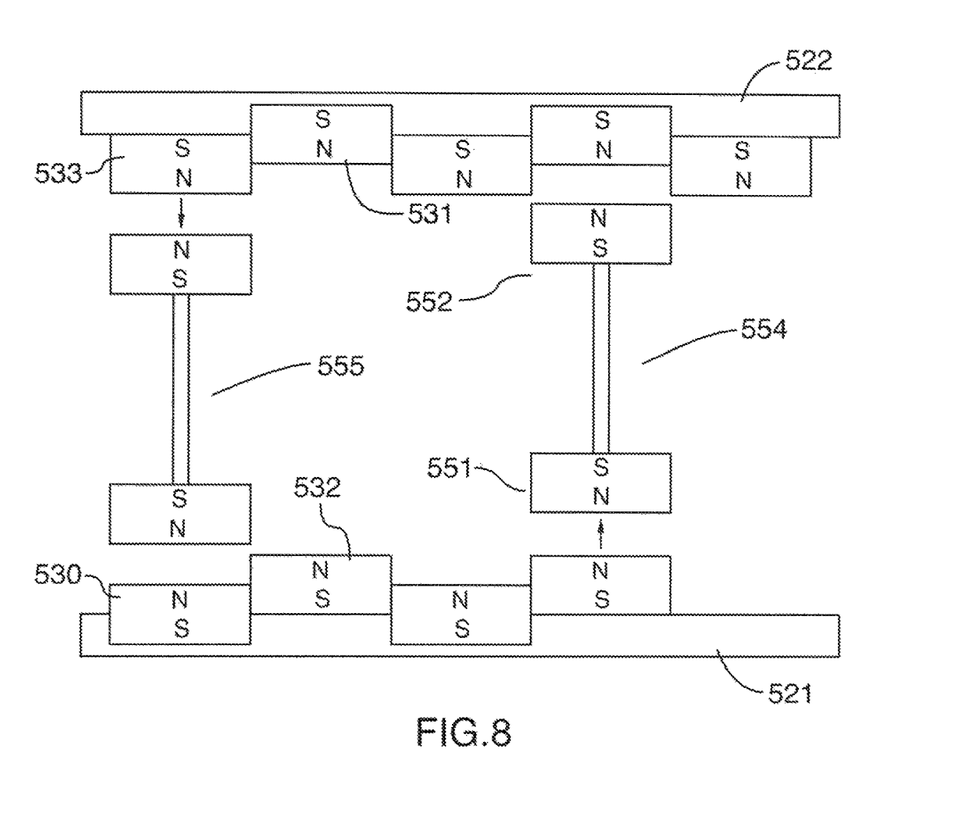
FIG. 8 is a partial side view illustrating an alternate rotor configuration for the electrical generator of FIG. 5; and, FIG. 9 is a perspective view illustrating the stator of the electrical generator of FIG. 5.
Figure 9:
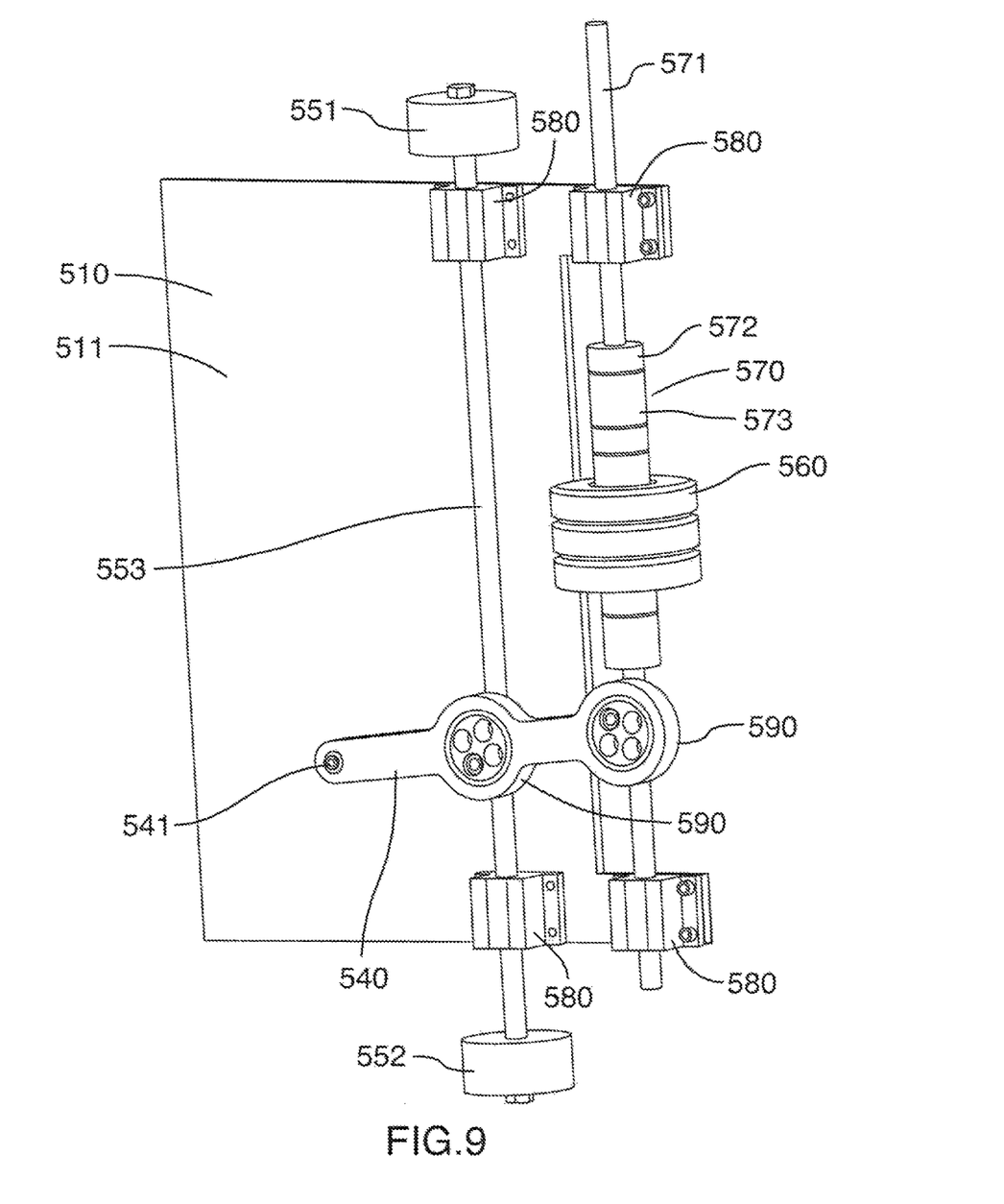

FIG. 5 is a cross-sectional view illustrating an embodiment of an electrical generator 500 having a levered translator, the lever of the translator shown in a lowered position. FIG. 6 is a cross-sectional view illustrating the electrical generator 500 of FIG. 5, the lever of the translator shown in a raised position. FIG. 7 is a partial side view illustrating a rotor configuration for the electrical generator 500 of FIG. 5. FIG. 8 is a partial side view illustrating an alternate rotor configuration for the electrical generator 500 of FIG. 5. And, FIG. 9 is a perspective view illustrating the stator of the electrical generator 500 of FIG. 5.

According to one embodiment, an electrical generator 500 is provided that includes a rotor 520 having lower and upper (or first and second) rotor plates or disks 521, 522 and a stator 510 adapted to travel or pass between the lower and upper rotor plates 521, 522. The rotor 520 includes spaced rotor magnets 530 and opposing spaced rotor magnets 531 mounted on the lower and upper rotor plates 521, 522 similar to that of the electrical generator of FIG. 4. The upper rotor plate 522 and magnets 531 may be optional. The stator 510 includes a frame 511 to which is moveably coupled a connecting rod 553 at a first or left side and a guide rod 571 at a second or right side. The connecting rod 553 has lower and upper lifting magnets 551, 552 mounted at lower and upper ends thereof. The guide rod 571 has a translator 570 mounted proximate the middle thereof. The translator 570 includes one or more magnets 572 separated by one or more ferrous spacers 573 and is configured to pass through a coil 560 which is mounted to the second or right side of the frame 511. As further described below, a lever 540 is pivot or pin 541 coupled to the frame 511 proximate a first or left end thereof, to the connecting rod 553 proximate a middle thereof, and to the guide rod 571 proximate a second or right end thereof.

The lever 540 acts as a distance multiplier. The lever 540 may be a third class lever in which the fulcrum is proximate the first end of the lever 540 at the point where the lever 540 is pin 541 coupled to the frame 511 of the stator 510, the effort in the form of the lower and upper lifting magnets 551, 552 and the connecting rod 553 is coupled to the lever 540 proximate the middle, and the load in the form of the translator 570 mounted on the guide rod 571 is coupled at the second end of the lever 540. In such a configuration, the distance traveled at the effort is proportional to the length of the lever 540, that is, if the effort is exerted at the half way point, the distance traveled at the effort point will be two times a much. Although FIGS. 5-6 and 9 show the use of a third class lever 540, any lever may be used to accomplish the same result by varying the length of the lever and the insertion points of the effort, fulcrum, and load.

In operation, the rotor magnets (e.g., 530) push on a lifting magnet (e.g., the lower lifting magnet 551) coupled to the lift magnet connecting rod 553 moving the connecting rod 553 from a lowered position 554 to a raised position 555 which, via the lever 540, in turn moves the guide rod 571 and translator 570 from a lowered position 574 to a raised position 575. The repelling force between the two magnets 530, 551 hence pushes or moves the translator 570 through the coil 560 inducing current therein. The distance the translator 570 is moved through the coil 560 is multiplied by the action of the lever 540.

The connections between the lever 540 and each of the translator guide rod 571 and the lift magnet connecting rod 553 may be via sliding mechanisms 590 (e.g., eccentric pivots, sliding surfaces such as v-groove bearings, etc.) to facilitate keeping both the translator 570 and the lift magnets 551, 552 in the same plane. If the connections were pivot points, and not sliding mechanisms 590, then the lever 540 would move in an arc. Such an embodiment would require additional components to keep the coil 560 at the right attitude such that the translator 570 passes through the coil 560 rather than hitting the coil 560.

The coil 560 may be formed over a short tube (having a length similar to that of the coil 560 itself) or free formed leaving only a small air gap 561 between the translator 570 and the coil 560. The guide rod 571 for the translator 570 and the lift magnet connecting rod 553 are located and guided via bearings 580 mounted to the solid frame 511 of the stator 510 to maintain the rods 571, 553 in the same plane.

Rather than relying on gravity as the downward force for moving the translator 570 from the raised position 575 to the lowered position 574, the optional top plate 522 of the rotor 520 and magnets 531 mounted thereon may provide the required or additional force. A magnet may also be optionally attached to the topside and/or bottomside of the lever 540.

As shown in FIG. 7, the magnets 530, 531 on the rotor 520 may be spaced apart and sized such that only one magnet from either rotor plate 521, 522 interacts with the lift magnets 551, 552. Alternatively, as shown in FIG. 8, the magnets 530, 531 on the rotor 520 may be adjacent but may have different heights relative to the plane of the rotor plate 521, 522 to provide a primary lift rotor magnet 532, 533 and a secondary lift rotor magnet 530, 531. The primary lift rotor magnets 532, 533 are closest to the lift magnets 551, 552 providing a major push force thereto. The secondary lift rotor magnets 530, 531 are further away from the lift magnets 551, 552 providing a minor push force thereto. According to one embodiment, magnets of different sizes mounted on the same plane may be used to achieve a similar result. The larger magnets would provide the primary lift force whereas the smaller magnets would provide enough magnetic flux to "lock" the lift magnet assembly (i.e., lift magnets 551, 552 and connecting rod 553) in place.

According to other embodiments, rather than a lever 540, other devices such as a linkage, pulley, gearing system, screw mechanism, piston that drives a fluid (hydraulic) or gas (pneumatic), etc., may be used which are attached to magnets 551, 552 driven by the rotor plates 521, 522 and which subsequently push/pull the translator 570 within the electrical generator 500. For example, a large gear attached to a smaller gear requires only slight movement to achieve a full rotation. The movement of the large gear may be caused by the lift magnet assembly 551, 552, 553 and the smaller gear may be attached to a linkage that is attached to the translator 570 to provide a distance multiplication similar to the lever 540 described above. As another example, with respect to the use of a fluid/gas in a syringe, a small movement of the plunger results in fluid traveling a great distance through the needle relative to the travel of the plunger. Here, the lift magnet 551 would be attached to the plunger and the fluid/air would cause the movement in the translator 570 via tubing once again resulting in a net multiplication of distance traveled.

According to one embodiment, rather than having the translator 570 move through the coil 560 to generate electricity, the translator 570 may be kept stationary, and the coil 560 may be moved over the translator 570. For example, magnets may be attached to the ends of a tube that has a copper coil mounted therearound and the rotor magnets 530 may be used to push the tube and coil assembly while keeping the translator 570 stationary. As another example, the lever 540 may be attached to the coil 560 while the translator 570 remains stationary and the lift magnets 551, 552 may be used push the coil 560 over the translator 570 to generate electricity.

Thus, according to one embodiment, there is provided an electrical generator 500, comprising: a stator 510 having a coil 560 and a lift magnet 551 coupled by a lever 540 to an induction magnet 572, the induction magnet 572 moveable longitudinally within the coil 560, the lever 540 configured to move the induction magnet 572 a multiple of a distance that the lift magnet 551 is moved; and, a rotor 520 moveable with respect to the stator 510, the rotor 520 having a rotor magnet 530, the rotor magnet 530 and the lift magnet 551 positioned with respective magnetic moments opposing; whereby movement of the rotor magnet 530 toward the lift magnet 551 causes the lift magnet 551 to move away from the rotor magnet 530 which in turn causes, by operation of the lever 540, the induction magnet 572 to move within the coil 560 to generate a first electromotive force therein.

In the above electrical generator 500, the lift magnet 551 and the induction magnet 572 may be configured to move vertically on the stator 510 and the stator 510 may be positioned over the rotor 520; whereby movement of the rotor magnet 530 horizontally toward the lift magnet 551 causes the lift magnet 551 to move upward on the stator 510 and away from the rotor magnet 530 which in turn causes, by operation of the lever 540, the induction magnet 572 to move upward within the coil 560 to generate the first electromotive force therein; and, whereby movement of the rotor magnet 530 horizontally away from the lift magnet 551 causes the lift magnet 551 to move downward on the stator 510 due to gravity which in turn causes, by operation of the lever 540, the induction magnet 572 to move downward within the coil 560 to generate a second electromotive force therein. The rotor magnet 572 may move in a plane perpendicular to a longitudinal axis of the stator 510. The coil 560 may be a wire helically wrapped around a tube. The stator 510 may have a plurality of induction magnets 572 and a plurality of coils 560. The plurality of induction magnets 572 and the plurality of coils 560 may be configured to generate three-phase power. The electrical generator 500 may further include a plurality of rotor magnets 530 mounted on the rotor 520 for sequentially repelling the lift magnet 551. The plurality of rotor magnets 530 may be spaced apart horizontally on the rotor 520. Adjacent rotor magnets 530, 532 of the plurality of rotor magnets 530 may be positioned at different vertical heights on the rotor 520. The rotor 520 may be a lower rotor plate 521 positioned below the stator 510 and the electrical generator 500 may further include an upper rotor plate 522 positioned over the stator 510. The lift magnet 551 may be a lower lift magnet 551 and the electrical generator 500 may further include an upper lift magnet 552 coupled to the lower lift magnet 551 by a connecting rod 553. The connecting rod 553 may be slideably mounted to a frame 511 of the stator 510. The induction magnet 572 may be mounted on a guide rod 571 and the guide rod 571 may be slideably mounted to the frame 511 of the stator 510. The coil 560 may be mounted on the frame 511 of the stator 510 and the guide rod 571 and the induction magnet 572 may be configured to pass through the coil 560. The lever 540 may be a third class lever pivot coupled to the frame 511 of the stator 510 at a first end of the lever 540, pivot coupled to the connecting rod 553 proximate a midpoint of the lever 540, and pivot coupled to the guide rod 571 at a second end of the lever 540. The electrical generator 500 may further include a first plurality of rotor magnets 530 mounted on the lower rotor plate 521 for sequentially repelling the lower lift magnet 551 and a second plurality of rotor magnets 531 mounted on the upper rotor plate 522 for sequentially repelling the upper lift magnet 552. The first and second plurality of rotor magnets 530, 531 may be spaced apart horizontally on the lower and upper rotor plates 521, 522, respectively. The first plurality of rotor magnets 530 may be offset horizontally from the second plurality of rotor magnets 531. Adjacent rotor magnets 530, 532, 531, 533 of the first and second plurality of rotor magnets 530, 531 may be positioned at different vertical heights on the lower and upper rotor plates 521, 522, respectively. The rotor 520 may be mechanically coupled to a turbine. The rotor 520 may be directly coupled to blades vertical axis wind turbine. And, the lift magnet 551, induction magnet 572, and rotor magnet 530 may be permanent magnets.

According to another embodiment there is provided a method of generating electricity, comprising: providing a stator 510 having a coil 560 and a lift magnet 551 coupled by a lever 540 to an induction magnet 572, the induction magnet 572 moveable longitudinally within the coil 560, the lever 540 configured to move the induction magnet 572 a multiple of a distance that the lift magnet 551 is moved; and, moving a rotor 520 with respect to the stator 510, the rotor 520 having a rotor magnet 530, the rotor magnet 530 and the lift magnet 551 positioned with respective magnetic moments opposing; whereby moving the rotor magnet 530 toward the lift magnet 551 causes the lift magnet 551 to move away from the rotor magnet 530 which in turn causes, by operation of the lever 540, the induction magnet 572 to move within the coil 560 to generate a first electromotive force therein.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

What is claimed is:

1. An electrical generator, comprising:
a stator having a lift magnet coupled by a lever to one of an induction magnet and a coil to move longitudinally and relatively the one of the induction magnet and coil to which the lever is coupled, the lift magnet moving in a same direction as the one of the induction magnet and the coil, the lever configured to move the one of the induction magnet and the coil a multiple of a distance that the lift magnet is moved using, respectively, a connecting rod coupling the lift magnet and a guide rod coupling the one of the induction magnet and the coil to the lever and wherein the lever is pivotally connected to the stator; and,
a rotor moveable with respect to the stator, the rotor having a rotor magnet, the rotor magnet and the lift magnet positioned with respective magnetic moments opposing;

whereby movement of the rotor magnet toward the lift magnet causes the lift magnet to move away from the rotor magnet which in turn causes, by operation of the lever, the relative movement of the induction magnet and the coil to generate a first electromotive force therein.

2. The electrical generator of claim 1, wherein the lift magnet and the induction magnet are configured to move vertically on the stator and the stator is positioned over the rotor; whereby movement of the rotor magnet horizontally toward the lift magnet causes the lift magnet to move upward on the stator and away from the rotor magnet which in turn causes, by operation of the lever, the induction magnet to move upward within the coil to generate the first electromotive force therein; and, whereby movement of the rotor magnet horizontally away from the lift magnet causes the lift magnet to move downward on the stator due to gravity which in turn causes, by operation of the lever, the induction magnet to move downward within the coil to generate a second electromotive force therein.

3. The electrical generator of claim 1, wherein the rotor magnet moves in a plane perpendicular to a longitudinal axis of the stator.

4. The electrical generator of claim 1, wherein the coil is a wire helically wrapped around a tube.

5. The electrical generator of claim 1, wherein the stator has a plurality of induction magnets and a plurality of coils.

6. The electrical generator of claim 5, wherein the plurality of induction magnets and the plurality of coils are configured to generate three-phase power.

7. The electrical generator of claim 1, further comprising a plurality of rotor magnets mounted on the rotor for sequentially repelling the lift magnet.

8. The electrical generator of claim 7, wherein the plurality of rotor magnets are spaced apart horizontally on the rotor.

9. The electrical generator of claim 7, wherein adjacent rotor magnets of the plurality of rotor magnets are positioned at different vertical heights on the rotor.

10. The electrical generator of claim 1, wherein the rotor is a lower rotor plate positioned below the stator and further comprising an upper rotor plate positioned over the stator.

11. The electrical generator of claim 10, wherein the lift magnet is a lower lift magnet and further comprising an upper lift magnet coupled to the lower lift magnet by the connecting rod.

12. The electrical generator of claim 11, wherein the connecting rod is slideably mounted to a frame of the stator.

13. The electrical generator of claim 12, wherein the induction magnet is mounted on the guide rod and the guide rod is slideably mounted to the frame of the stator.

14. The electrical generator of claim 13, wherein the coil is mounted on the frame of the stator and the guide rod and the induction magnet are configured to pass through the coil.

15. The electrical generator of claim 14, wherein the lever is a third class lever pivot coupled to the frame of the stator at a first end of the lever, pivot coupled to the connecting rod proximate a midpoint of the lever, and pivot coupled to the guide rod at a second end of the lever.

16. The electrical generator of claim 15, further comprising a first plurality of rotor magnets mounted on the lower rotor plate for sequentially repelling the lower lift magnet and a second plurality of rotor magnets mounted on the upper rotor plate for sequentially repelling the upper lift magnet.

17. The electrical generator of claim 16, wherein the first and second plurality of rotor magnets are spaced apart horizontally on the lower and upper rotor plates, respectively.

18. The electrical generator of claim 17, wherein the first plurality of rotor magnets are offset horizontally from the second plurality of rotor magnets.

19. The electrical generator of claim 17, wherein adjacent rotor magnets of the first and second plurality of rotor magnets are positioned at different vertical heights on the lower and upper rotor plates, respectively.

20. The electrical generator of claim 1, wherein the rotor is mechanically coupled to a turbine.

21. The electrical generator of claim 20, wherein the rotor is directly coupled to blades of a vertical axis wind turbine.

22. The electrical generator of claim 1, wherein the lift magnet, induction magnet, and rotor magnet are permanent magnets.

23. A method of generating electricity, comprising:
providing a stator having a lift magnet coupled by a lever to one of an induction magnet and a coil to move longitudinally and relatively the one of the induction magnet and coil to which the lever is coupled, the lift magnet moving in a same direction as the one of the induction magnet and the coil, the lever configured to move the one of the induction magnet and the coil a multiple of a distance that the lift magnet is moved using, respectively, a connecting rod coupling the lift magnet and a guide rod coupling the one of the induction magnet and coil to the lever and wherein the lever is pivotally connected to the stator; and,
moving a rotor with respect to the stator, the rotor having a rotor magnet, the rotor magnet and the lift magnet positioned with respective magnetic moments opposing;
whereby moving the rotor magnet toward the lift magnet causes the lift magnet to move away from the rotor magnet which in turn causes, by operation of the lever, the relative movement of the induction magnet and the coil to generate a first electromotive force therein.

* * * * *